United States Patent
Ferber

(10) Patent No.: US 7,499,374 B2
(45) Date of Patent: Mar. 3, 2009

(54) DETERMINING ACCEPTABILITY OF SENSOR LOCATIONS USED TO PERFORM A SEISMIC SURVEY

(75) Inventor: Ralf Ferber, Horsham (GB)

(73) Assignee: WesternGeco L.L.C., Houston, TX (US)

( * ) Notice: Subject to any disclaimer, the term of this patent is extended or adjusted under 35 U.S.C. 154(b) by 25 days.

(21) Appl. No.: 11/638,877

(22) Filed: Dec. 14, 2006

(65) Prior Publication Data

US 2008/0144438 A1  Jun. 19, 2008

(51) Int. Cl.
    *G01V 1/20* (2006.01)
(52) U.S. Cl. ........................... 367/58; 702/14
(58) Field of Classification Search ............... 367/16, 367/43, 58, 56; 702/14
    See application file for complete search history.

(56) References Cited

U.S. PATENT DOCUMENTS

| | | | | |
|---|---|---|---|---|
| 3,731,269 A | * | 5/1973 | Judson et al. | 367/54 |
| 5,136,550 A | * | 8/1992 | Chambers | 367/38 |
| 5,502,687 A | * | 3/1996 | Mackay | 367/54 |
| 5,668,775 A | * | 9/1997 | Hatteland | 367/19 |
| 5,696,733 A | * | 12/1997 | Zinn et al. | 367/19 |
| 5,757,722 A | * | 5/1998 | Zinn | 367/19 |
| 6,131,070 A | * | 10/2000 | Ferber | 702/14 |
| 6,138,075 A | * | 10/2000 | Yost | 702/14 |
| 6,201,765 B1 | * | 3/2001 | Ireson | 367/38 |
| 6,446,009 B1 | * | 9/2002 | Baeten et al. | 702/17 |
| 6,480,440 B2 | * | 11/2002 | Douma et al. | 367/21 |
| 6,668,228 B1 | * | 12/2003 | Ozbek et al. | 702/17 |
| 6,847,896 B1 | * | 1/2005 | Orban et al. | 702/14 |
| 2005/0190650 A1 | * | 9/2005 | Ferber et al. | 367/43 |
| 2006/0256654 A1 | * | 11/2006 | Paulsen | 367/20 |

FOREIGN PATENT DOCUMENTS

GB    2411473 A    8/2005

OTHER PUBLICATIONS

Ozbek et al. Multidimensional Filtering of Irregularly Sampled Seismic Data. 13th European Signal Processing Conference. Sep. 4-8, 2005. Antalya, Turkey.*

* cited by examiner

*Primary Examiner*—Ian J Lobo
(74) *Attorney, Agent, or Firm*—Ari Pramudji; Liangang (Mark) Ye; Jeffrey E. Griffin

(57) ABSTRACT

Method for determining acceptability of sensor locations used to perform a seismic survey. In one implementation, the method includes obtaining a first set of reference data, generating a first output trace from a second set of reference data estimated from the first set of reference data at a plurality of planned sensor locations, generating a second output trace from a third set of reference data estimated at a plurality of actual sensor locations and comparing the second output trace with the first output trace to determine whether the variation between the second output trace and the first output trace is less than a predetermined value.

28 Claims, 10 Drawing Sheets

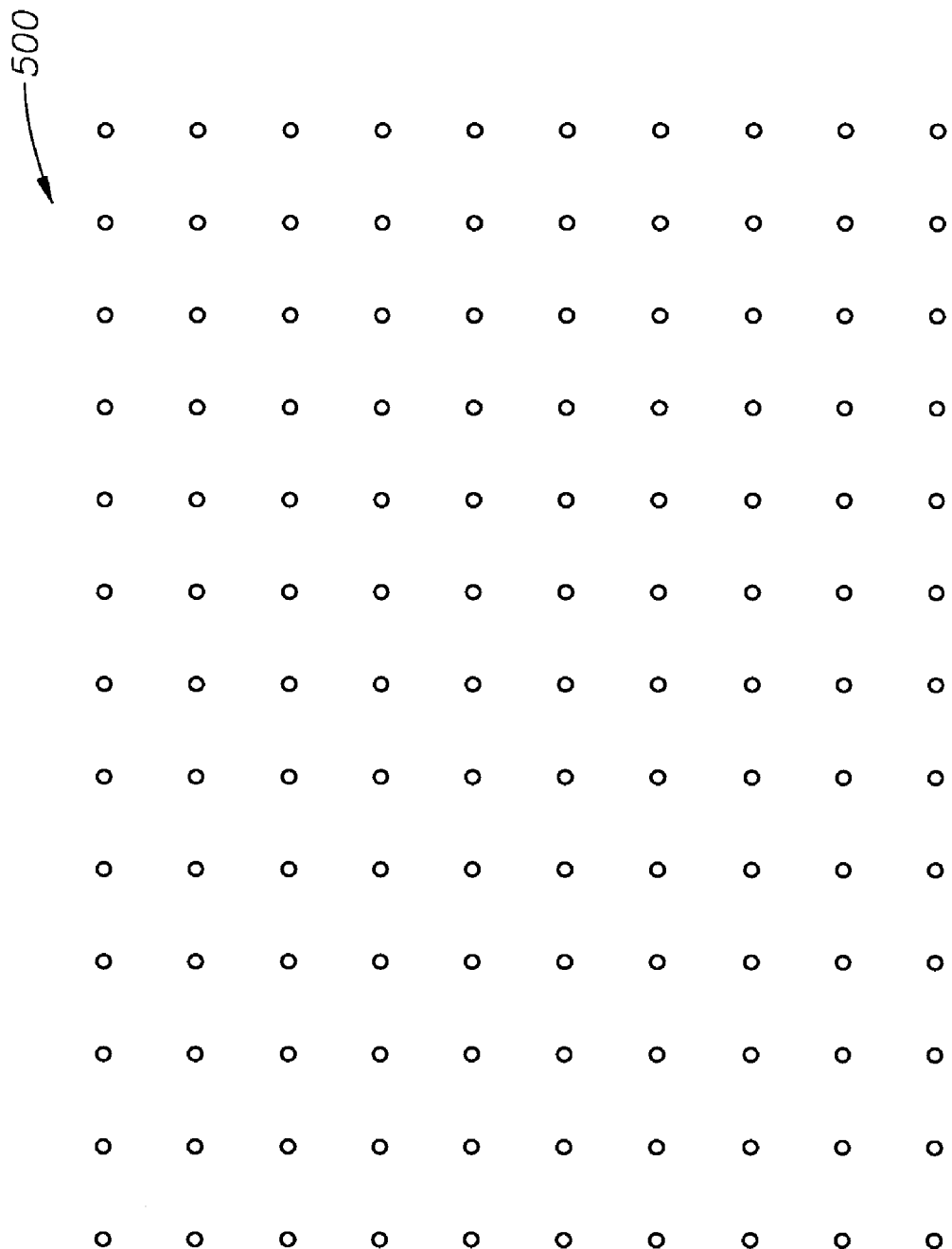

DETERMINING ACCEPTABILITY OF SENSOR LOCATIONS USED TO PERFORM A SEISMIC SURVEY

BACKGROUND

1. Field of the Invention

Implementations of various technologies described herein generally relate to seismic data acquisition, particularly the assessment of the impact of sensor locations on output trace quality.

2. Description of the Related Art

The following descriptions and examples are not admitted to be prior art by virtue of their inclusion within this section.

In a typical seismic survey, a plurality of seismic sources, such as explosives, vibrators, airguns or the like, may be sequentially activated at or near the surface of the earth to generate energy which may propagate into and through the earth. The seismic waves may be reflected back by geological formations within the earth. The resultant seismic wavefield may be sampled by a plurality of seismic sensors, such as geophones, hydrophones and the like. Each sensor may be configured to acquire seismic data at the sensor's location, normally in the form of a record or trace representing the value of some characteristic of the seismic wavefield against time. The acquired seismic data may be transmitted wirelessly or over electrical or optical cables to a recorder system. The recorder system may then store, analyze, and/or transmit the data. This data may be used to detect the possible presence of hydrocarbons, changes in the subsurface and the like.

Seismic data contains noise signals as well as the desired seismic reflection signals. Noise may interfere with the interpretation of the seismic signals and degrade the quality of the subsurface images obtained by processing the recorded seismic data. It may therefore be desirable to suppress or attenuate the noise that may be present in the recorded seismic data before processing the data. One method of noise attenuation that may be used in seismic acquisition is the process of analog group-forming. In this process, sensors may be hard-wired into groups or arrays of sensors. Each sensor array may produce an output trace that is the normalized sum (arithmetic average) of all traces acquired by the sensors in that array. However, high frequency components of some seismic events (for example, seismic events arising from dipped, non-horizontal reflectors) may be erroneously attenuated, while the low frequency components of ground-roll noise may not be attenuated.

Recently, single sensor acquisition (also known as point receiver recording) of seismic data has become possible. In single sensor acquisition, the sensors are not hard-wired into groups; rather, individual data traces recorded by each sensor may be recorded for processing. It may still be desirable to sum traces acquired by more than one sensor, but now the summation may be performed during the processing stage by summing any combination of the individual, digitized traces. Hence, this process may commonly be referred to as digital group-forming (DGF). Single sensor acquisition may allow the use of DGF for improved noise attenuation and signal preservation.

Typically, DGF includes the application of a multi-dimensional filter that may require regular sampling of the seismic data. Regular sampling in this context may include spatial sampling of seismic data at locations arranged on a regular grid such as a grid that is rectangular, square, hexagonal or the like. However in an actual seismic survey, the sensor locations may be spatially irregular and not on a regular grid due to obstacles, terrain and the like. Therefore, filters designed with regular theoretical data may produce output traces with distortion and noise leakage when applied to actual, irregularly sampled seismic data. It may be desirable to have a method to measure the quality of the output traces to determine if the actual, irregular sensor arrangement used in the seismic survey is producing acceptable results or introducing noise, aliasing and other errors.

SUMMARY

Described herein are implementations of various technologies for a method for determining acceptability of sensor locations used to perform a seismic survey. In one implementation, the method includes obtaining a first set of reference data, generating a first output trace from a second set of reference data estimated from the first set of reference data at a plurality of planned sensor locations, generating a second output trace from a third set of reference data estimated at a plurality of actual sensor locations and comparing the second output trace with the first output trace to determine whether the variation between the second output trace and the first output trace is less than a predetermined value.

In another implementation, the method includes (a) obtaining a first set of reference data, (b) mapping a plurality of planned sensor locations to the first set of reference data, (c) interpolating a second set of reference data at the planned sensor locations, (d) convolving the second set of reference data with a filter to generate a target output trace at approximately the center of the second set of reference data, (e) acquiring a set of actual data over a survey area, (f) organizing the set of actual data into one or more digital group-formed sets of actual data, (g) convolving each digital group-formed set of actual data with the filter to generate an actual survey output trace at approximately the center of each digital group-formed set of actual data, (h) mapping a plurality of actual sensor locations corresponding to a digital group-formed set of actual data to the first set of reference data, (i) interpolating a third set of reference data at the actual sensor locations corresponding to the digital group-formed set of actual data, (j) convolving the third set of reference data with the filter to generate an output trace for the third set of reference data at approximately the center of the third set of reference data and (k) comparing the output trace for the third set of reference data to the target output trace.

Described herein are also implementations of various technologies for a computer system. In one implementation, the system includes a processor and a memory comprising program instructions executable by the processor to: obtain a first set of reference data, generate a first output trace from a second set of reference data estimated from the first set of reference data at a plurality of planned sensor locations, organize a set of actual data into one or more digital group-formed sets of actual data, interpolate a third set of reference data at a plurality of actual sensor locations corresponding to each digital group-formed set of actual data, generate a second output trace from the third set of reference data and compare the second output trace to the first output trace.

Described herein are also implementations of various technologies for a method for acquiring seismic data. In one implementation, the method includes obtaining a first set of reference data, generating a first output trace from a second set of reference data estimated from the first set of reference data at a plurality of planned sensor locations, generating a second output trace from a third set of reference data estimated at a plurality of actual sensor locations, comparing the second output trace with the first output trace to determine whether the variation between the second output trace and the first output trace is less than a predetermined value, determining that the actual sensor locations are acceptable if the variation is less than the predetermined value, acquiring a set of actual data at the actual sensor locations and storing the acquired set of actual data into a storage medium.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIGS. 5A-C illustrate an example of defining a DGF data set in accordance with implementations of various technologies described herein.

DETAILED DESCRIPTION

Figure 1:
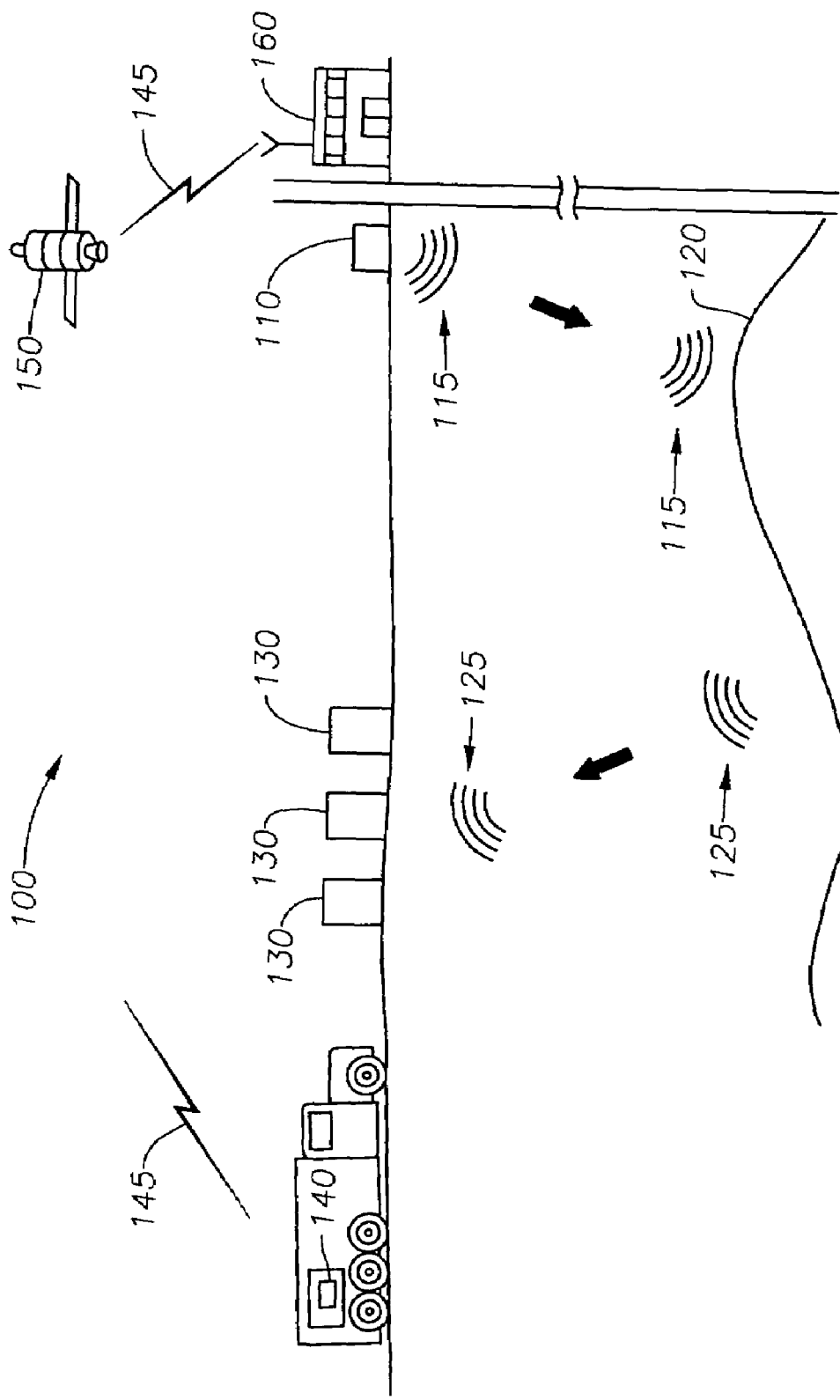
FIG. 1 illustrates a seismic acquisition system in accordance with implementations of various technologies described herein.

In general, one or more implementations of various technologies described herein are directed to a method for determining if actual sensor locations used in a seismic survey are producing acceptable results or introducing errors. The method may include calculating a target output trace from reference data estimated at planned sensor locations, calculating a reference output trace from reference data estimated at actual sensor locations, and comparing the target output trace and the reference output trace to determine the variation. The magnitude of the variation between the traces may indicate the magnitude of the impact of the sensor locations on an actual survey output trace.

In one implementation, a first reference data set that is small, finely sampled, and with regular geometry may be obtained. The planned sensor locations may then be mapped onto the first reference data set such that a second reference data set may be estimated at the planned sensor locations. The second reference data set may be convolved with a filter to generate a target output trace. Similarly, the actual sensor locations corresponding to a set of actual data may be mapped onto the first reference data set such that a third reference data set may be estimated at the actual sensor locations. The third reference data set may be convolved with a filter to generate a reference output trace. The reference output trace may then be compared to the target output trace to determine the impact of actual sensor locations on the actual survey output trace. In one implementation, the various estimation steps described herein may be accomplished using various interpolation techniques. In another implementation, the trace comparison may be made by computing a transfer function. In yet another implementation, the transfer function may be used to make corrective adjustments to an actual survey output trace.

In one or more implementations of various technologies described herein, the method above may be utilized to measure the quality of DGF output traces. In the DGF process, the seismic survey data may be grouped into several sets of single sensor data traces, referred to as DGF data sets. Each DGF data set may be convolved with a DGF filter to produce a DGF output trace. As such, a seismic survey may be processed to produce a plurality of DGF output traces. The DGF process may be described in more detail in commonly assigned U.S. Patent Application Publication US2005/0190650, entitled "Method and Apparatus for Filtering Irregularly Sampled Data", which is incorporated herein by reference.

For clarity, sensor locations will be depicted in the drawings as open circles, while seismic data or traces obtained at these sensor locations will be depicted as filled circles.

FIG. 1 illustrates a seismic acquisition system 100 in accordance with implementations of various technologies described herein. In one implementation, the seismic acquisition system 100 may include one or more seismic sources 110, a plurality of seismic sensors 130, one or more data collection units 140 and a fixed-base facility 160. In operation, a source 110 may generate a plurality of seismic signals 115 into the earth. The seismic signals 115 may be reflected by subterranean geological formations 120 and return to the sensors 130. The sensors 130 may then acquire and record the seismic signals 125. The sensors 130 may then transmit the recorded seismic data via wired or wireless links to a data collection unit 140. The data collection unit 140, which may include one or more single recorder systems, may be configured to store, process and/or transmit the seismic data. The data from the data collection unit 140 may be transmitted to the fixed-base facility 160 via a satellite 150 and satellite links 145 for further processing and/or storage.

Figure 2:
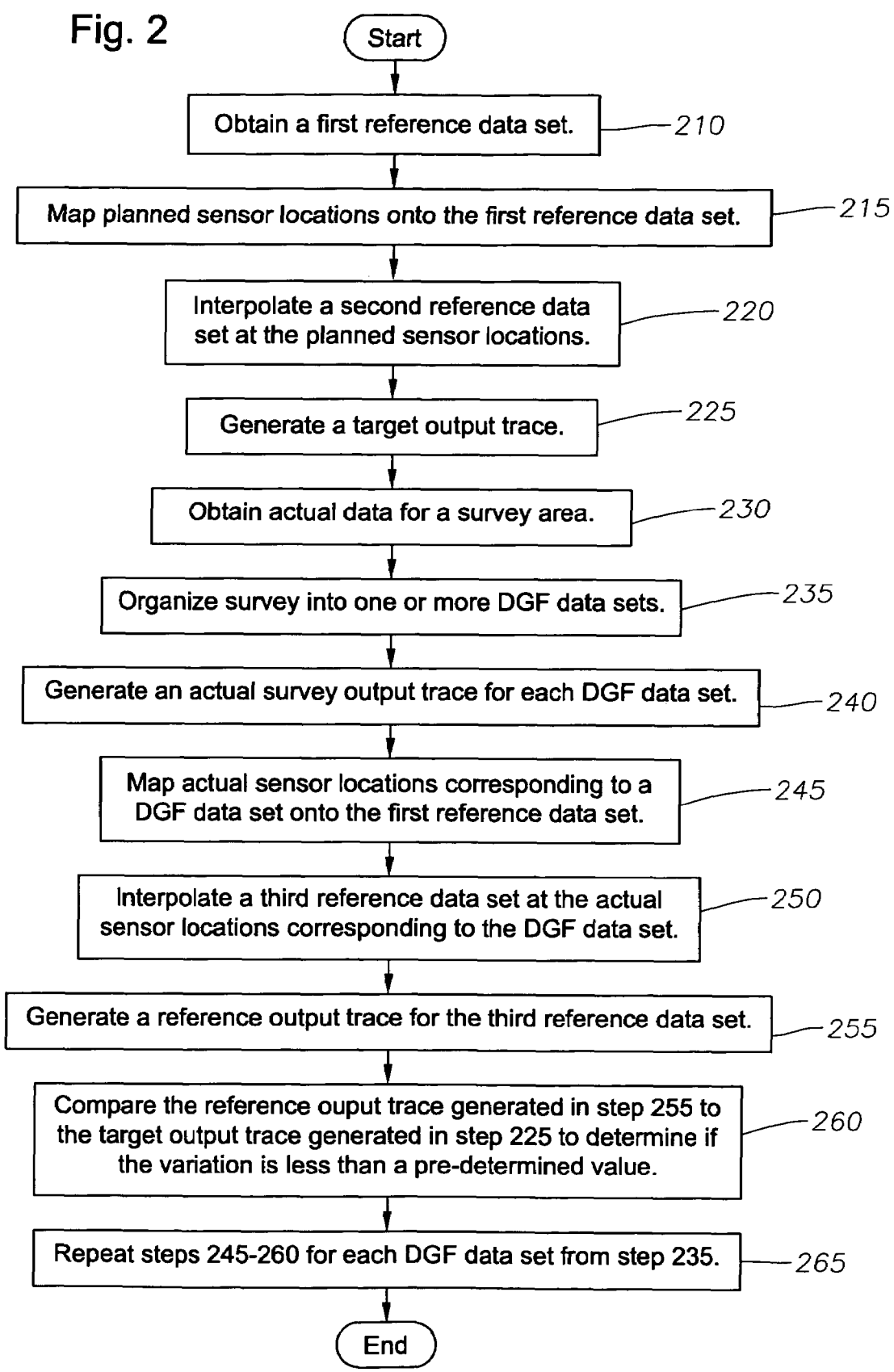
FIG. 2 illustrates a flow diagram of a method for determining the impact of sensor locations used to perform a seismic survey on output trace quality in accordance with implementations of various technologies described herein.

FIG. 2 illustrates a flow diagram of a method 200 for determining the impact of sensor locations used to perform a seismic survey on output trace quality in accordance with implementations of various technologies described herein. It should be understood that while the operational flow diagram 200 indicates a particular order of execution of the operations, in other implementations, the operations might be executed in a different order.

At step 210, a first reference data set may be obtained. The first reference data set may include acquired or synthetic seismic data arranged in a dense, regular geometry. In one implementation, the area covered by the first reference data set may be larger than the area of a DGF set of actual data such that the actual sensor locations corresponding to a DGF set of actual data may be fully mapped into the first reference data set, which is described in more detail at step 245 below.

Figure 3:
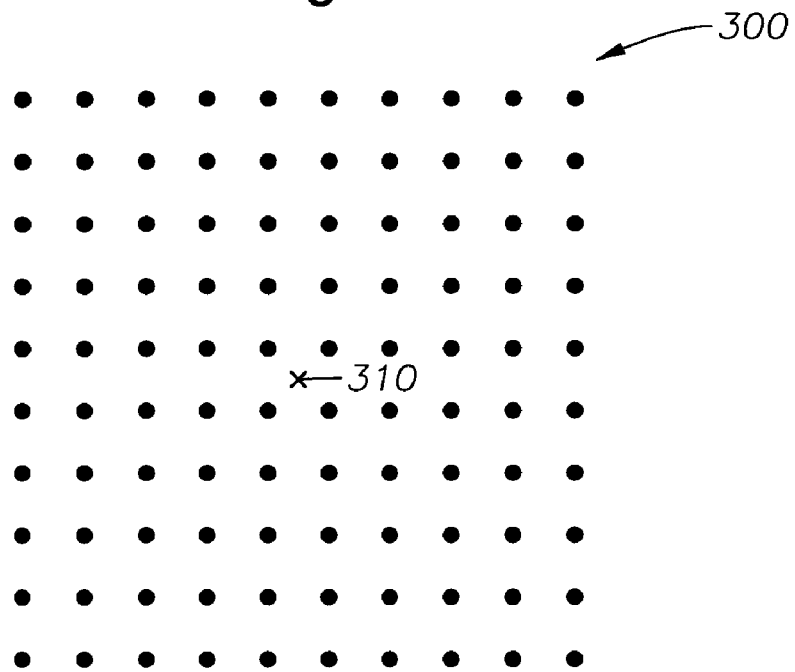
FIG. 3 illustrates a first reference data set that may be obtained in accordance with implementations of various technologies described herein.

FIG. 3 illustrates a first reference data set 300 that may be obtained in accordance with implementations of various technologies described herein. A square geometry is depicted; however, it should be understood that the first reference data 300 set may be in other regular geometries such as rectangular, hexagonal and the like. The reference data set 300 may consist of a plurality of common source records of increasing source distance from the sensors. The first reference data set 300 may have a location 310 substantially at the center of the reference data traces. In one implementation, the reference data set 300 may be acquired in a pre-survey acquisition over a small fraction of the survey area. It should be noted that each trace in the first reference data set 300 may be obtained by a sensor. The sensors may be single sensors or bundled analog arrays designed to simulate single sensor records. In another implementation, this acquisition may be combined with a typical pre-survey acquisition designed to analyze the noise regime in an area. Although every effort may be made to acquire the reference data set 300 on a regular grid, some correction may be necessary. For instance, the reference data set 300 may be corrected using interpolation techniques to ensure that the reference data is on a regular grid. Alternatively, the reference data set 300 may be computer modeled using synthetic data reflecting key features of the expected real data. In one implementation, several reference data sets 300 may be acquired, coarsely distributed throughout the survey area.

Figure 4A:
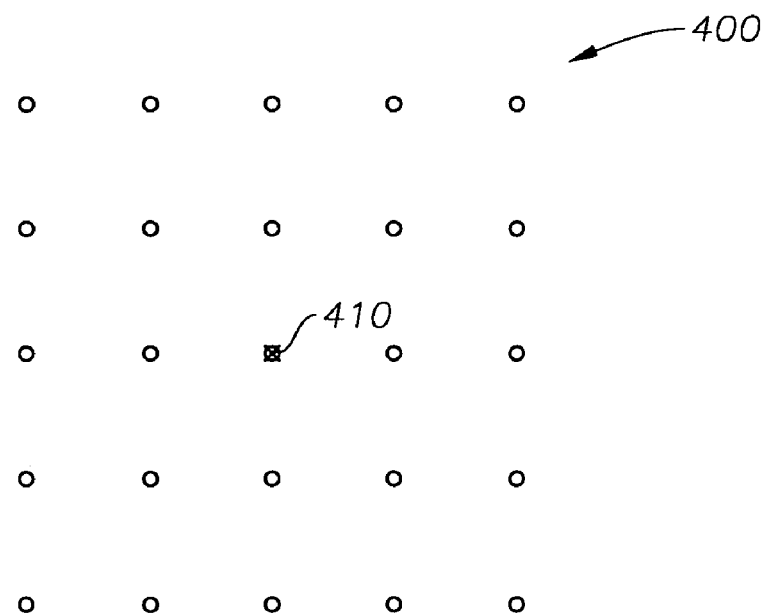
FIGS. 4A-C illustrate steps used to generate a target output trace in accordance with implementations of various technologies described herein.
Figure 4B:
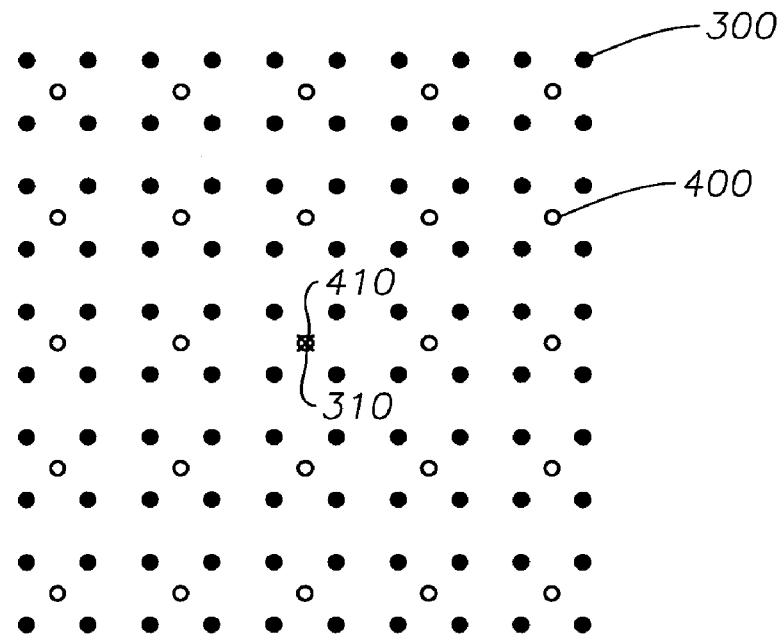

At step 215, the planned survey sensor locations may be mapped onto the first reference data set 300. In one implementation, a subset of the planned survey sensor locations with substantially the area of a single DGF data set may be mapped onto the first reference data set 300. FIG. 4A illustrates a subset of the planned survey sensor locations 400 for approximately a single DGF data set. The planned survey sensor locations 400 may have a location 410 substantially at the center. FIG. 4B illustrates the planned sensor locations 400 (open circles) of a digital group-formed data set mapped onto the first reference data set 300 (filled circles). The planned sensor locations 400 may be mapped onto the first reference data set 300 such that the location 410 substantially at the center of the planned sensor locations 400 overlays the location 310 substantially at the center of the first reference data set 300.

Figure 4C:
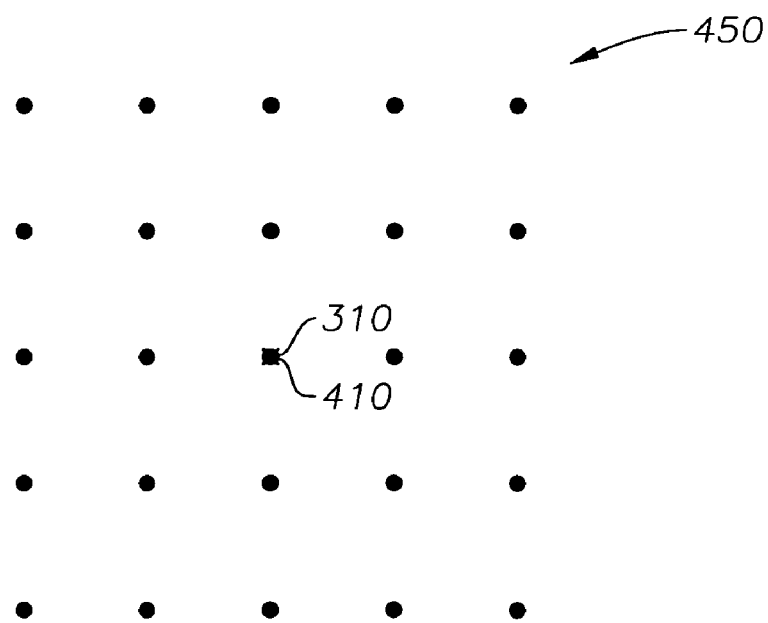

At step 220, a second reference data set may be interpolated from the first reference data set at the planned sensor locations 400. The second reference data set may be interpolated using various interpolation techniques, including 2D sinc interpolation filtering. FIG. 4C illustrates the second reference data set 450 with interpolated reference data at planned sensor locations 400 in accordance with implementations of various technologies described herein.

At step 225, a target output trace may be generated from the second reference data set 450. In one implementation, the second reference data set 450 may now be convolved with a filter to produce a target output trace substantially at the center of the second reference data set 450 at location 310, which substantially coincides with location 410. The target output trace may represent the ideal output of the regular sensor geometry of the planned survey.

Figure 5B:
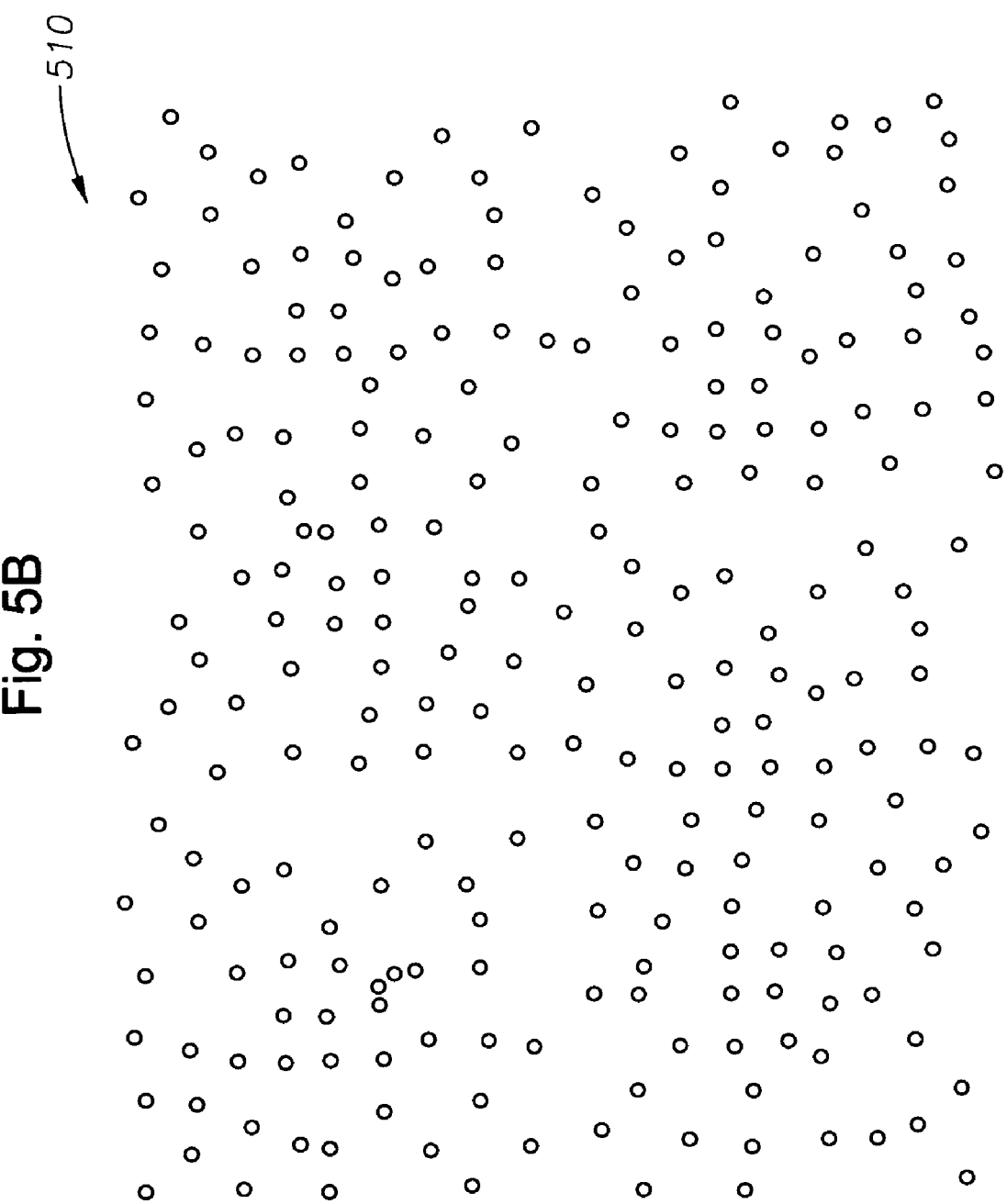

At step 230, actual seismic data may be obtained for a survey area. In one implementation, the actual data may be previously acquired data. In another implementation, a seismic acquisition survey may be performed over an entire area of interest using the acquisition system 100 shown in FIG. 1. As illustrated in FIG. 5A, the planned sensor arrangement 500 of a seismic survey may be a regular geometry such as rectangular, square, hexagonal, or the like. However as illustrated in FIG. 5B, obstacles, terrain and the like may cause the actual sensor layout 510 to be irregular in areas of the survey.

Figure 5C:
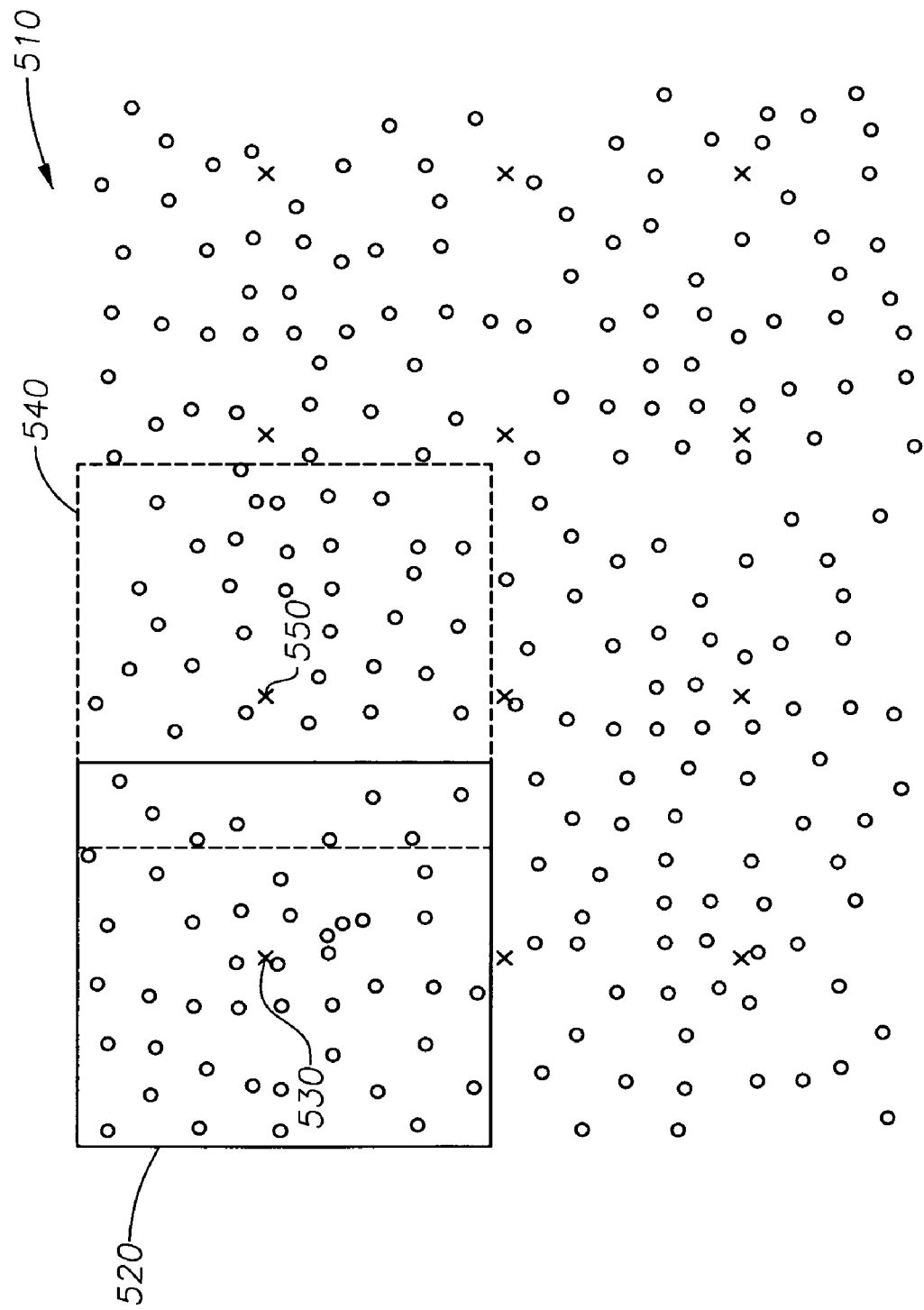

At step 235, the actual seismic survey may be organized into one or more DGF data set. The DGF data sets may be formed such that actual DGF output traces may be produced on a regular, coarse grid. FIG. 5C illustrates the actual sensor layout 510 grouped into one or more DGF data sets, such as DGF data sets 520 and 540. It should be noted that each sensor in the actual sensor layout 510 may produce seismic data at its location. As such, FIG. 5C may be used to represent both the sensors and the seismic data of the survey grouped into DGF data sets groups.

At step 240, an actual survey output trace may be generated from each DGF data set. Each DGF data set may now be convolved with a filter to produce an actual output trace substantially at the center of each DGF data set, e.g., at location 530 for DGF data set 520 and at location 550 for DGF data set 540.

Figure 6A:
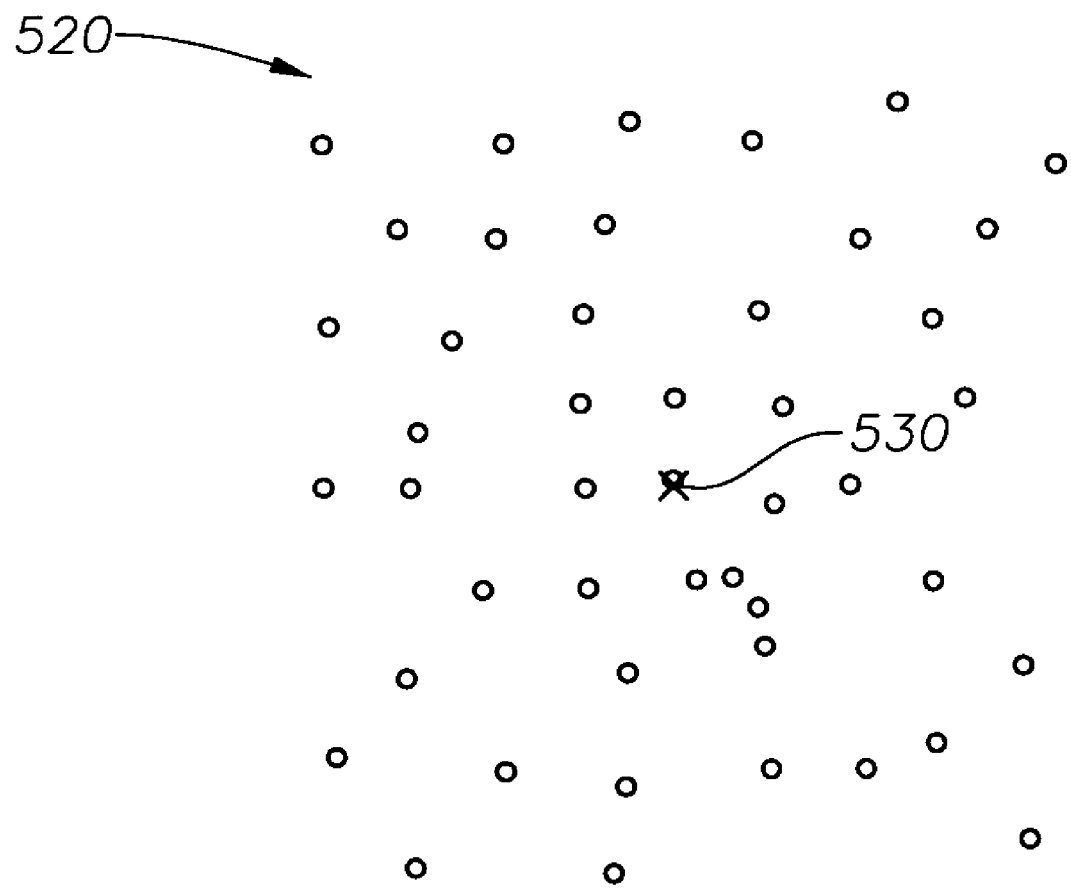
FIGS. 6A-C illustrate the steps used to generate a reference output trace in accordance with implementations of various technologies described herein.
Figure 6B:
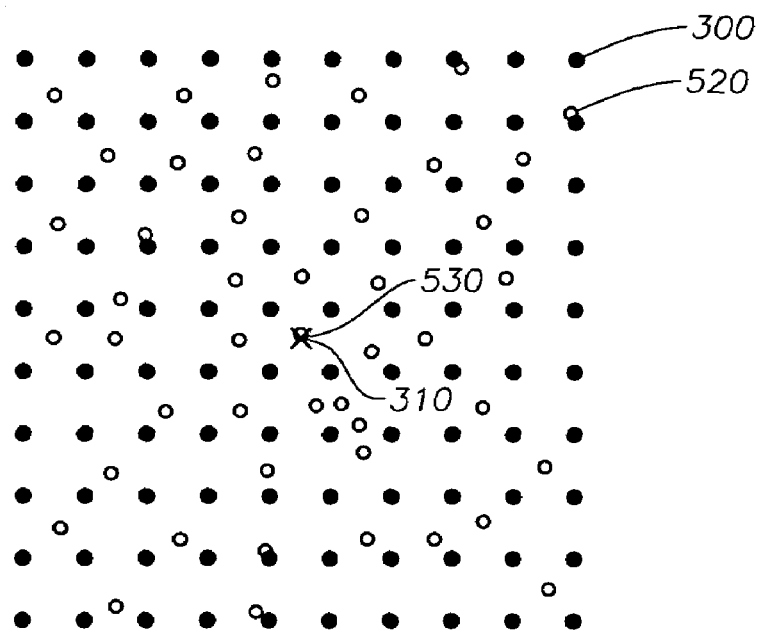

At step 245, the actual sensor locations corresponding to a single DGF data set, e.g., DGF data set 520, may be mapped onto the first reference data set 300. FIG. 6A illustrates the sensor locations making up a single DGF data set 520 with the actual survey output trace location 530 in the center. FIG. 6B illustrates the actual sensor locations (open circles) of DGF data set 520 mapped onto the first reference data set 300 (filled circles) of FIG. 3. The actual sensor locations may be mapped such that the actual survey output trace location 530 of DGF data set 520 may substantially coincide with location 310, which is substantially at the center of the first reference data set 300.

Figure 6C:
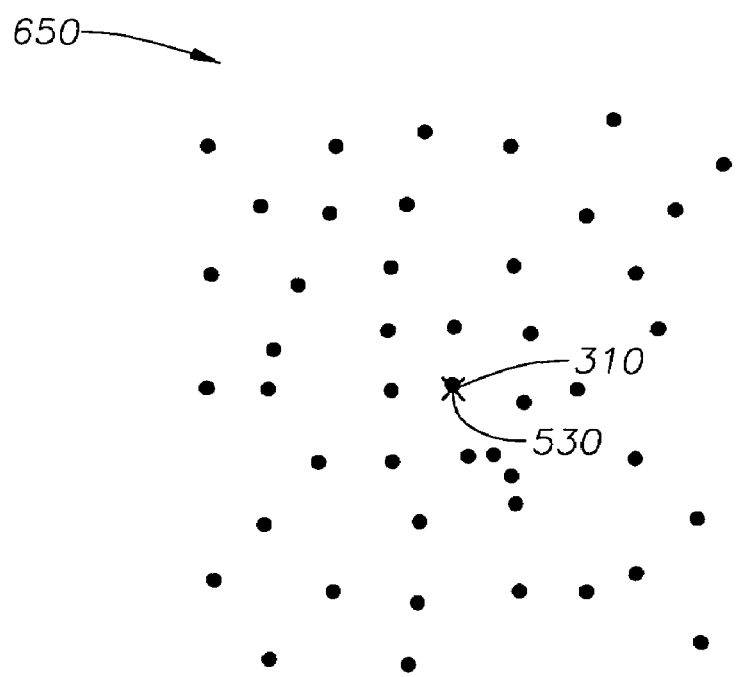

At step 250, a third reference data set may be interpolated from the first reference data set 300 at the actual sensor locations of the DGF data set 520. FIG. 6C illustrates the third reference data set 650 with interpolated reference data at actual sensor locations in accordance with implementations of various technologies described herein. Like the second reference data set, the third reference data set may be interpolated using various interpolation techniques, including 2D sinc interpolation filtering.

At step 255, a reference output trace may be generated from the third reference data set 650. In one implementation, the third reference data set 650 may be convolved with a filter to produce a reference output trace substantially at the center of the third reference data set 650 at location 310, which substantially coincides with location 530. It should be noted that the target output trace of step 225 was generated at location 310, which substantially coincides with location 410. Hence, the reference output trace may be substantially at the same location as the target output trace (generated at step 225).

At step 260, the reference output trace of step 255 may be compared to the target output trace to determine if the variation between the traces is less than a pre-determined value. Because the target output trace is calculated from regularly sampled reference data in the planned survey sensor geometry, it may represent the ideal (or target). The variation of the reference output trace calculated using actual, irregular sensor locations from the target output trace may indicate the impact of the irregularity of the actual sensor locations on the quality of output traces. If the traces are substantially the same, the irregular actual sensor locations may have had little effect on the quality of the output. If the traces are substantially different, the irregular actual sensor locations may have introduced significant distortion into the output. In one implementation, the comparison may be performed using a transfer function, for example by spectral division of the reference output trace computed in step 255 and the target output trace from step 225. The closer the transfer function may be to a band-limited zero-phase spike, the less impact the actual sensor locations may have had on the output.

At step 265, steps 245 to 260 may be repeated for each DGF data set defined in the seismic survey at step 235.

In one implementation, the transfer functions calculated in step 260 may be used to cross-equalize the actual survey output traces generated at step 240. Thus, in one implementation, the impact of sensor location on output traces may be assessed and the results of the assessment may be used to improve the quality of the actual data.

It should be understood that method 200 described above may utilize any filters including filters designed to apply weighted summation, simulate analog group forming and the like. In one implementation, steps 225 and 255-265 may be performed a plurality of times using different filters each time such that the quality of various filters may be compared. For example, the quality of a weighted summation filter could be compared to the quality of a simulated analog group-forming filter. As such, the improvement of the weighted summation over analog group-forming may be quantified.

Figure 7:
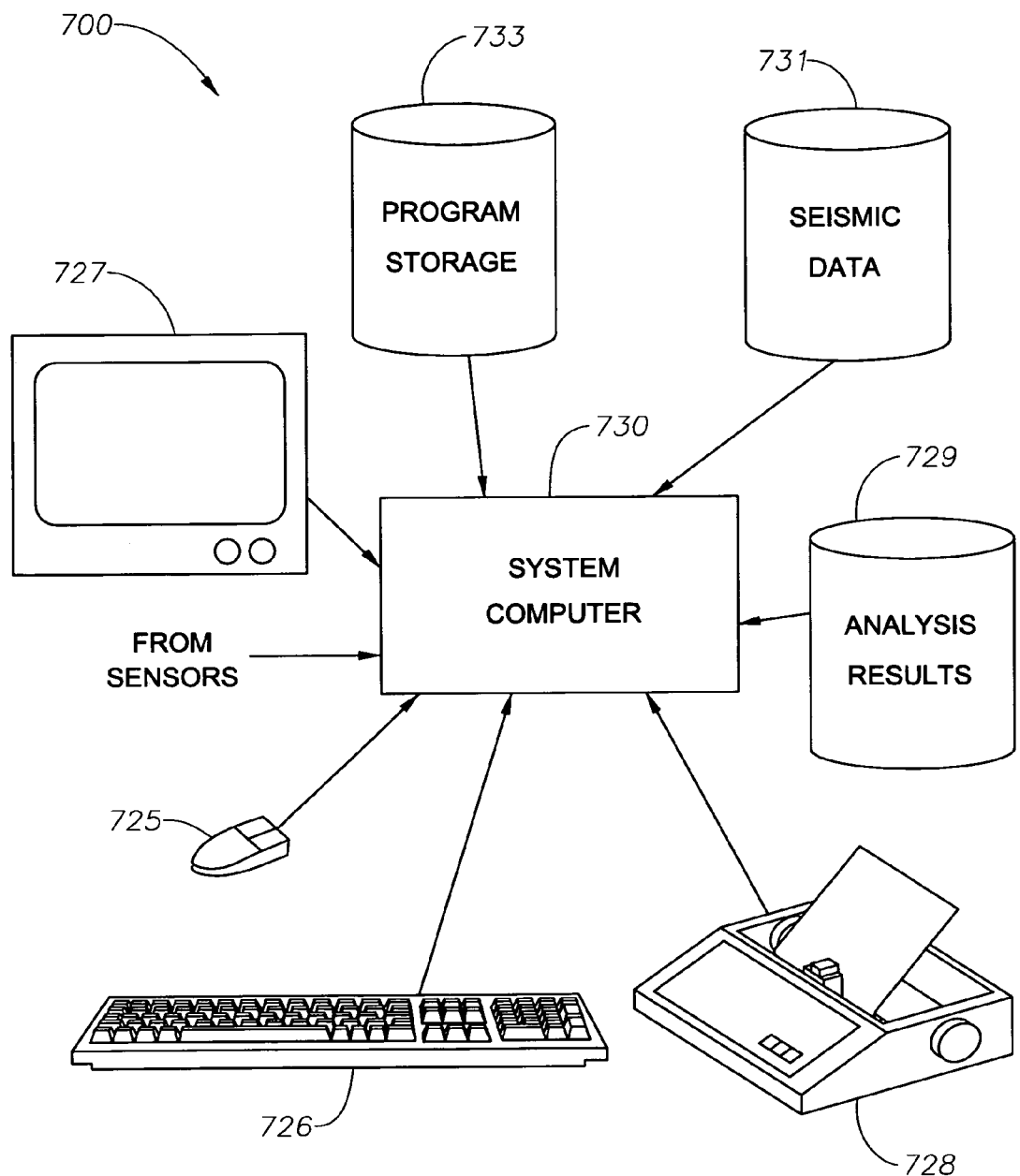
FIG. 7 illustrates a computer system, into which implementations of various technologies described herein may be implemented.

FIG. 7 illustrates a computer system 700, into which implementations of various technologies described herein may be implemented. The computer system 700 may include one or more system computers 730, which may be implemented as any conventional personal computer or server. However, those skilled in the art will appreciate that implementations of various technologies described herein may be practiced in other computer system configurations, including hypertext transfer protocol (HTTP) servers, hand-held devices, multi-processor systems, microprocessor-based or programmable consumer electronics, network PCs, minicomputers, mainframe computers, and the like.

The system computer 730 may be in communication with disk storage devices 729, 731, and 733, which may be external hard disk storage devices. It is contemplated that disk storage devices 729, 731, and 733 are conventional hard disk drives, and as such, will be implemented by way of a local area network or by remote access. Of course, while disk storage devices 729, 731, and 733 are illustrated as separate devices, a single disk storage device may be used to store any and all of the program instructions, measurement data, and results as desired.

In one implementation, seismic data from the receivers may be stored in disk storage device 731. The system computer 730 may retrieve the appropriate data from the disk storage device 731 to process seismic data according to program instructions that correspond to implementations of various technologies described herein. The program instructions may be written in a computer programming language, such as C++, Java and the like. The program instructions may be stored in a computer-readable medium, such as program disk storage device 733. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 730. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 730 may present output primarily onto graphics display 727, or alternatively via printer 728. The system computer 730 may store the results of the methods described above on disk storage 729, for later use and further analysis. The keyboard 726 and the pointing device (e.g., a mouse, trackball, or the like) 725 may be provided with the system computer 730 to enable interactive operation.

The system computer 730 may be located at a data center remote from the survey region. The system computer 730 may be in communication with the receivers (either directly or via a recording unit, not shown), to receive signals indicative of the reflected seismic energy. These signals, after conventional formatting and other initial processing, may be stored by the system computer 730 as digital data in the disk storage 731 for subsequent retrieval and processing in the manner described above. While FIG. 7 illustrates the disk storage 731 as directly connected to the system computer 730, it is also contemplated that the disk storage device 731 may be accessible through a local area network or by remote access. Furthermore, while disk storage devices 729, 731 are illustrated as separate devices for storing input seismic data and analysis results, the disk storage devices 729, 731 may be implemented within a single disk drive (either together with or separately from program disk storage device 733), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining acceptability of sensor locations used to perform a seismic survey, comprising:
   obtaining a first set of reference seismic data;
   generating a first output trace from a second set of reference seismic data estimated from the first set of reference seismic data at a plurality of planned sensor locations;
   generating a second output trace from a third set of reference seismic data estimated at a plurality of actual sensor locations;
   comparing the second output trace with the first output trace to determine whether the variation between the second output trace and the first output trace is less than a predetermined value; and
   determining that the actual sensor locations are acceptable based on the comparison.

2. The method of claim 1, wherein the actual sensor locations are determined as acceptable if the variation is less than the predetermined value.

3. The method of claim 1, further comprising storing a value representing the variation to a storage medium.

4. The method of claim 1, further comprising storing the second output trace to a storage medium.

5. The method of claim 1, wherein the actual sensor locations correspond to a digital group-formed set of actual seismic data.

6. The method of claim 1, wherein the first output trace is generated at approximately the center of the first set of reference seismic data.

7. The method of claim 1, wherein generating the first output trace comprises:
mapping the plurality of planned sensor locations to the first set of reference seismic data;
interpolating the second set of reference seismic data at the planned sensor locations; and
convolving the second set of reference seismic data with a filter to generate the first output trace at approximately the center of the second set of reference seismic data.

8. The method of claim 7, wherein the center of the first set of reference seismic data is substantially the same as the center of the planned sensor locations.

9. The method of claim 7, wherein the center of the first set of reference seismic data is substantially the same as the center of the second set of reference seismic data.

10. The method of claim 1, further comprising:
acquiring a set of actual seismic data over a survey area;
organizing the set of actual seismic data into one or more digital group-formed sets of actual seismic data; and
convolving each digital group-formed set of actual seismic data with the filter to generate an actual survey output trace at approximately the center of each digital group-formed set of actual seismic data.

11. The method of claim 10, further comprising:
determining that the actual sensor locations are acceptable if the variation is less than the predetermined value; and
storing the set of actual seismic data to a storage medium.

12. The method of claim 10, wherein generating the second output trace comprises:
(a) mapping the actual sensor locations corresponding to a digital group-formed set of actual seismic data to the first set of reference seismic data;
(b) interpolating the third set of reference seismic data at the actual sensor locations corresponding to the digital group-formed set of actual seismic data; and
(c) convolving the third set of reference seismic data with the filter to generate the second output trace at approximately the center of the third set of reference seismic data.

13. The method of claim 12, further comprising repeating steps (a) to (c) for each digital group-formed set of actual seismic data.

14. The method of claim 12, wherein the filter is a weighted summation filter.

15. The method of claim 12, wherein the center of the third set of reference seismic data is substantially the same as the center of the first set of reference seismic data.

16. The method of claim 10, wherein the first set of reference seismic data is acquired over a portion of the survey area.

17. The method of claim 10, wherein the first set of reference seismic data is acquired over a portion of the survey area prior to the acquisition of the set of actual seismic data.

18. The method of claim 1, wherein the first set of reference seismic data is acquired using a regular sensor arrangement.

19. The method of claim 1, wherein the first set of reference seismic data set is synthetic seismic data.

20. The method of claim 1, wherein the second output trace is compared with the first output trace using one or more transfer functions.

21. The method of claim 20, further comprising using the transfer functions to cross-equalize actual seismic data over a survey area.

22. A computer system, comprising:
a processor; and
a memory comprising program instructions executable by the processor to:
obtain a first set of reference seismic data;
generate a first output trace from a second set of reference seismic data estimated from the first set of reference seismic data at a plurality of planned sensor locations;
organize a set of actual seismic data into one or more digital group-formed sets of actual seismic data;
interpolate a third set of reference seismic data at a plurality of actual sensor locations corresponding to each digital group-formed set of actual seismic data;
generate a second output trace from the third set of reference seismic data; and
compare the second output trace to the first output trace.

23. The computer system of claim 22, wherein the program instructions executable by the processor to generate the first output trace comprises program instructions executable by the processor to:
interpolate the second set of reference seismic data at the planned sensor locations; and
convolve the second set of reference seismic data with a filter to generate the first output trace at approximately the center of the second set of reference seismic data.

24. The computer system of claim 22, wherein the program instructions executable by the processor to generate the second output trace comprises program instructions executable by the processor to convolve the third set of reference seismic data with a filter to generate the second output trace at approximately the center of the third set of reference seismic data.

25. A method for determining acceptability of sensor locations used to perform a seismic survey, comprising:
(a) obtaining a first set of reference seismic data;
(b) mapping a plurality of planned sensor locations to the first set of reference seismic data;
(c) interpolating a second set of reference seismic data at the planned sensor locations;
(d) convolving the second set of reference seismic data with a filter to generate a target output trace at approximately the center of the second set of reference seismic data;
(e) acquiring a set of actual seismic data over a survey area;
(f) organizing the set of actual seismic data into one or more digital group-formed sets of actual seismic data;
(g) convolving each digital group-formed set of actual seismic data with the filter to generate an actual survey output trace at approximately the center of each digital group-formed set of actual seismic data;
(h) mapping a plurality of actual sensor locations corresponding to a digital group-formed set of actual seismic data to the first set of reference seismic data;

(i) interpolating a third set of reference seismic data at the actual sensor locations corresponding to the digital group-formed set of actual seismic data;

(j) convolving the third set of reference seismic data with the filter to generate an output trace for the third set of reference seismic data at approximately the center of the third set of reference seismic data;

(k) comparing the output trace for the third set of reference seismic data to the target output trace; and (l) determining that the actual sensor locations are accertable based on the comparison.

26. The method of claim 25, wherein the actual sensor locations of the digital group-formed set of actual seismic data are determined as acceptable if the variation between the output trace for third set of reference seismic data and the target output trace is less than a predetermined value.

27. The method of claim 25, further comprising repeating steps (h)-(l) for each digital group-formed set of actual seismic data.

28. A method for acquiring seismic data, comprising:

obtaining a first set of reference seismic data;

generating a first output trace from a second set of reference seismic data estimated from the first set of reference seismic data at a plurality of planned sensor locations;

generating a second output trace from a third set of reference seismic data estimated at a plurality of actual sensor locations;

comparing the second output trace with the first output trace to determine whether the variation between the second output trace and the first output trace is less than a predetermined value;

determining that the actual sensor locations are acceptable if the variation is less than the predetermined value;

acquiring a set of actual seismic data at the actual sensor locations; and storing the acquired set of actual seismic data into a storage medium.

* * * * *